June 20, 1967     J. W. RICHARDS     3,326,315
GEAR SELECTOR ARRANGEMENT FOR MOTOR VEHICLE
Filed May 25, 1966     2 Sheets-Sheet 2
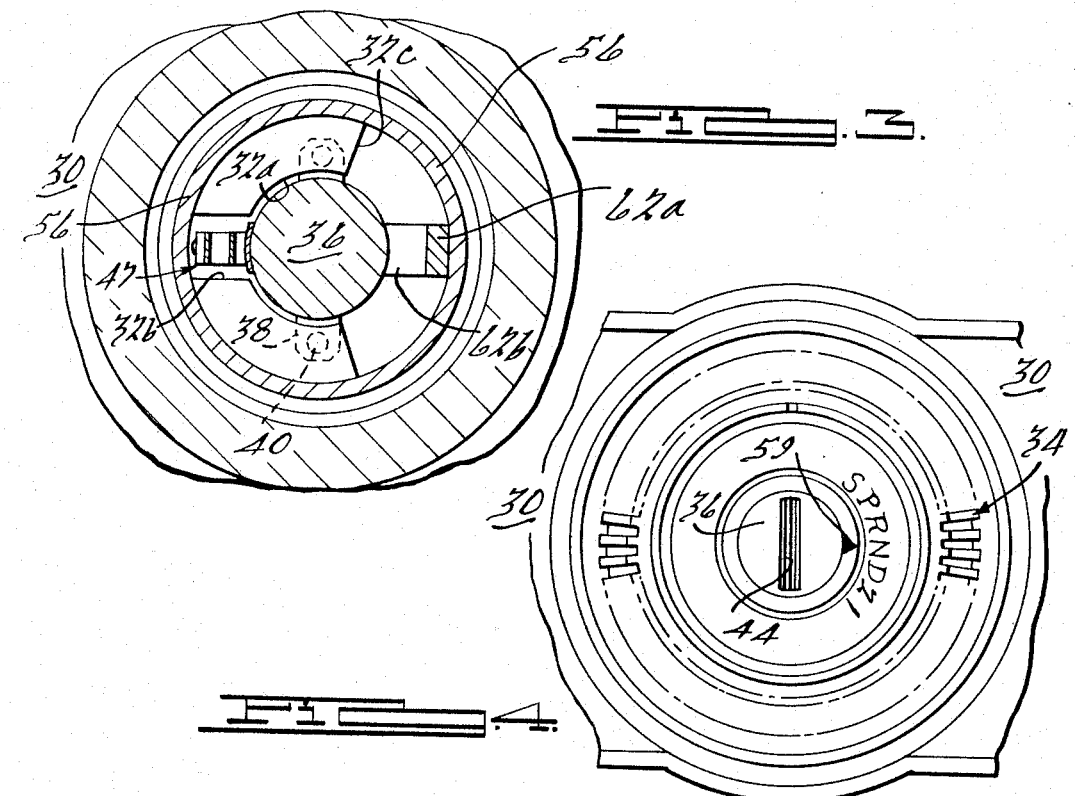
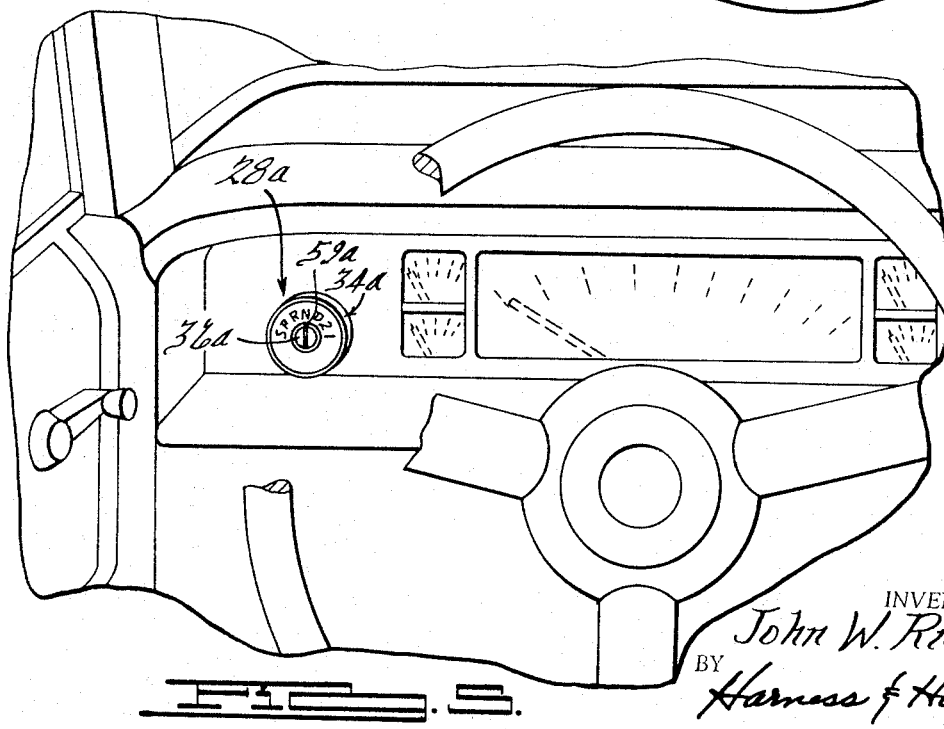
INVENTOR.
John W. Richards
BY
Harness & Harris
ATTORNEYS

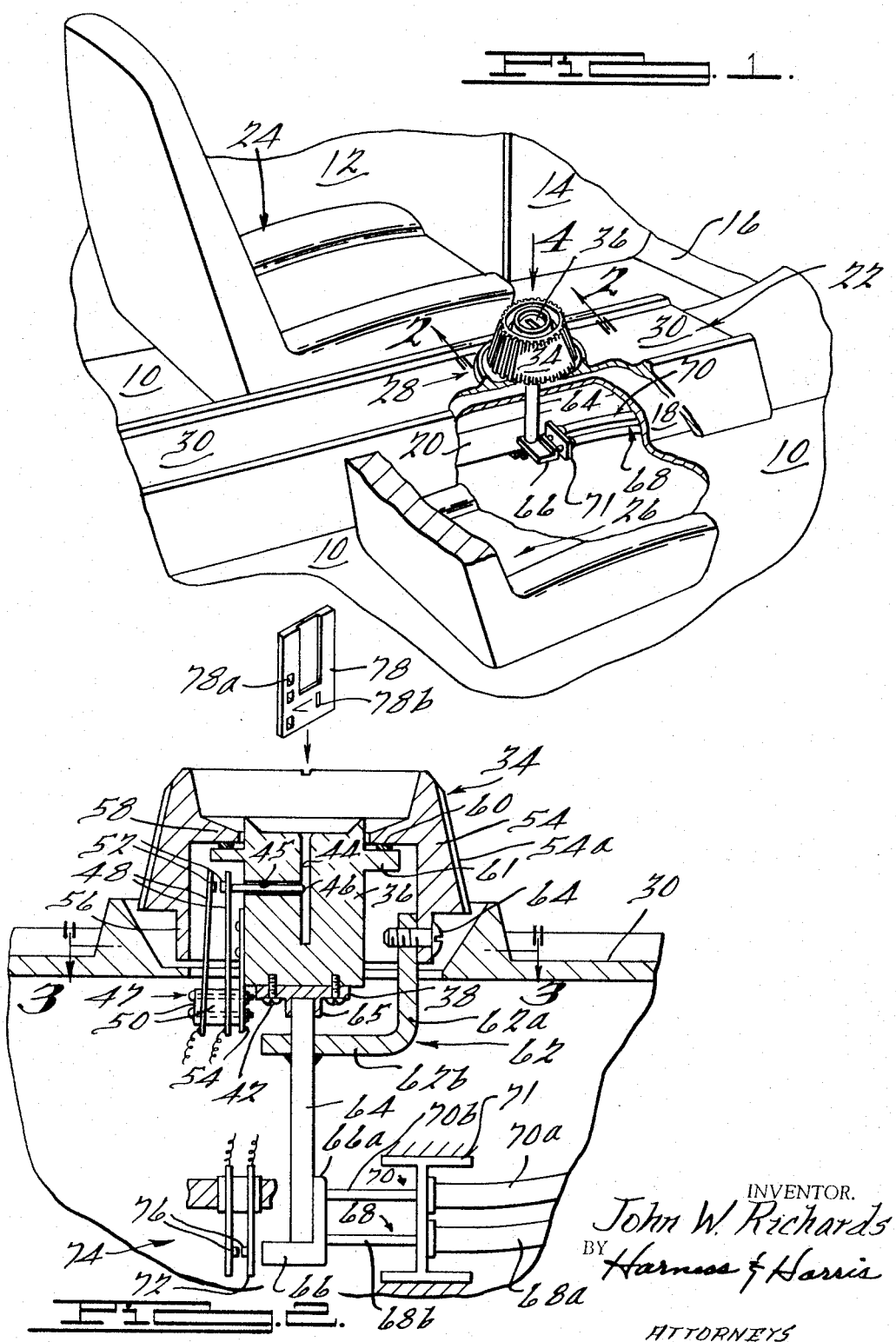

United States Patent Office 3,326,315
Patented June 20, 1967

3,326,315
GEAR SELECTOR ARRANGEMENT FOR MOTOR VEHICLE
John W. Richards, Huntington Woods, Mich., assignor to Chrysler Corporation, Highland Park, Mich., a corporation of Delaware
Filed May 25, 1966, Ser. No. 552,854
7 Claims. (Cl. 180—77)

This invention relates to motor vehicle controls. More particularly, it relates to an improved gear selector arrangement for a motor vehicle having an automatic transmission.

It is an object of the present invention to provide an improved control arrangement for a motor vehicle.

A more specific object is to provide an improved gear selector arrangement for a motor vehicle.

A yet more specific object is to provide an improved gear selector arrangement for a motor vehicle having an automatic transmission.

Yet another object is to provide a control unit for a motor vehicle combining the gear selector member and ignition switch in a single compact assembly.

These and other objects, features and advantages of the invention will be apparent from the following detailed description of a preferred embodiment of the invention and from the accompanying drawings wherein:

FIG. 1 is a fragmentary perspective view of a motor vehicle embodying a gear selector arrangement according to the invention;

FIG. 2 is a fragmentary cross sectional view taken on line 2—2 of FIG. 1;

FIG. 3 is a fragmentary cross sectional view taken on line 3—3 of FIG. 2;

FIG. 4 is a plan view looking in the direction of the arrow 4 in FIG. 1; and

FIG. 5 is a fragmentary perspective view showing a modified form of the gear selector arrangement of FIGS. 1–4.

The motor vehicle shown fragmentarily in FIG. 1 includes a floor pan 10, left front door 12, kick panel 14, toe board 16, drive shaft tunnel 18, drive shaft 20, console 22, driver's seat 24, and front passenger seat 26.

A combination gear selector-ignition switch assembly 28 is positioned on the top wall 30 of console 22 at a location between and slightly forwardly of seats 24, 26. An aperture is provided in top console wall 30 to accommodate assembly 28. The aperture includes a central circular portion 32a, a slot portion 32b opening at one side of central portion 32a, and a sector portion 32c fanning out from the other side of central portion 32a.

Assembly 28 includes a generally annular gear selector member 34 and an ignition switch member 36. Switch member 36 is cylindrical in shape and is positioned within central circular portion 32a of the aperture. A bracket 38 is secured as by screws 40 to the underside of console top wall 30 and to the underside of switch member 34 as by screws 42. Bracket 38 thus maintains member 34 in a fixed position relative to console 22. A central, vertical slot 44 is provided in switch member 36 and a horizontal, radial bore 45 intersects slot 44 and opens at the outer periphery of switch member 36. A pin 46 is slidably received in radial bore 45.

A contact assembly 47, including blades 48, insulators 50, and contact points 52, is secured to switch member 34 by a mounting bracket 54. Contact assembly 47 is received within the slot portion 32b of aperture 32.

Gear selector member 34 includes a knob portion 54, a skirt portion 56, and a partition portion 58.

Knob portion 54 defines an outer frustro conical surface 54a which is serrated to facilitate grasping. Partition portion 58 is centrally apertured to pass the upper end of cylindrical switch member 36. The upper annular face of partition portion 58 carries a plurality of indicia (FIG. 4) which selectively coact with a fixed reference pointer 59 on the upper end face of switch member 36. The indicia on partition portion 58 are, in clockwise sequence, S (Start), P (Park), R (Reverse), N (Neutral), D (Drive or High Gear), 2 (Second Gear), and 1 (Low Gear).

The arcuate extent of the indicia on partition portion 58 approximates the arcuate extent of selector portion 32c of the aperture. The lower face of partition portion 58 rides on a bearing ring 60 interposed between partition portion 58 and an external collar portion 61 of switch member 36. Gear selector member 34 is thus journalled for rotation on switch member 36.

One leg 62a of an angle bracket 62 is secured as by a screw 64 to the inner face of skirt portion 56 of selector member 34. The other leg 62b of bracket 62 extends radially inwardly from bracket portion 62a for securement at its free end to a vertical rod 64. The free upper end of rod 64 is journalled in a boss 65 formed integrally with bracket 38 on the underside of the latter.

A radial arm 66 is fixedly secured at one end to the lower end of rod 64. A pair of control cables 68, 70 are secured to a tag 66a upstanding from the free or outer end of radial arm 66. Cables 68, 70, may, for example be of the Bowden type and may each include an outer fixed sheath 68a, 70a, and an inner wire 68b, 70b slidable axially within the corresponding sheath. Sheath 68a, 70a may be secured to a fixed bracket 71.

Cable 68 is adapted to selectively position the control valve of an automatic transmission. Cable 70 controls a parking sprag which is adapted to lockingly engage a gear on the transmission output shaft. Details of a transmission control mechanism suitable for use with the gear selector arrangement of the present invention are disclosed in copending United States patent application Ser. No. 461,269 filed June 4, 1965. A three forward speed automatic transmission suitable for use with the control mechanism of the above-identified copending application is shown in United States Patent No. 3,035,457, issued on May 22, 1962, to B. W. Cartwright.

It will be seen that rotation of annular gear member 34 sequentially moves the indicia on partition portion 58 into alignment with reference pointer 59 and simultaneously rotates radial arm 66 to impart a push or pull to cable wires 68b, 70b. As cable wire 68b is moved axially within its sheath 68a, the control valve for the automatic transmission is positioned sequentially in a plurality of positions to sequentially condition the transmission for a plurality of moves of operation.

Specifically, with gear selector member 34 positioned to dispose the indicium 1 opposite reference pointer 59, cable wire 68b disposes the transmission control valve in a position where the transmission will operate continuously in the lowest gear ratio. With selector 34 positioned to dispose the indicium 2 opposite pointer 59, cable wire 68b disposes the control valve in a position where the transmission will operate initially in low gear and thereafter automatically upshift to second gear. With the indicium D opposite pointer 59, cable wire 68b disposes the control valve in a position where the transmission will operate initially in low gear, thereafter automatically upshift to second gear, and thereafter upshift to high gear. With indicium N opposite pointer 59, the control valve is positioned to condition the transmission for neutral or idle operation with no power being delivered to the transmission output shaft. With indicium R opposite pointer 59, the control valve is positioned to condition the transmission for operation in its single, reverse gear ratio. As gear selector 34 is rotated to bring the indicium P opposite pointer 59, cable wire 68b moves the control valve to a neutral position and cable wire 70b simultaneously moves the parking sprag into a position of locking engagement with the aforementioned gear on the transmission output shaft.

Further clockwise movement of gear selector 34 beyond the P or Park position brings the S or Start indicium opposite pointer 59. As indicium S arrives at pointer 59, radial arm 66 moves into engagement with one blade 72 of a contact assembly 74 to bring contact points 76 into engagement.

When it is desired to start the engine of the motor vehicle, a suitable key or card 78 is inserted downwardly into slot 44. As card 78 moves downwardly in slot 44, it engages the inner end of pin 46 and slides pin 46 radially outwardly in radial bore 45 to bring contact points 52 together. It will be understood that the ignition switch shown is merely schematic; the actual switch employed might be of the standard pin tumbler type or, alternatively, might contain sensing means capable of sensing the presence of a suitable pattern of magnetic data 78a and/or cut outs 78b on card 78.

After contacts 52 have been closed by insertion of card 78, annular gear selector 34 may be rotated to bring the S or Start indicium opposite pointer 59; this movement closes contacts 72 and completes a circuit to the engine starter motor through contacts 52 and contacts 72. After the engine has been started, the transmisison may be conditioned for the particular operational move desired by rotating annular gear selector 34 to the desired angular position.

In the modified form of the inveniton shown in FIG. 5, the gear selector-ignition switch assembly 28a is mounted on the instrument panel to the left of the steering wheel. Assembly 28a includes an ignition switch member 36a and an annular gear selector member 34a encircling switch member 36a and carrying S–P–R–N–D–2–1 indicia which may be selectively brought into register with pointer 59a by selective rotation of annular member 34a. It will be understood that the journalling of annular member 34a on ignition switch member 36a, as well as the manner in which the rotary movement of annular member 36a is converted into selective shifting movement of the control valve for the transmission, may generally correspond to the appropriate structure previously described with reference to the FIGS. 1–4 embodiment of the invention.

I claim:

1. In a motor vehicle of the type including an engine, a transmission having a plurality of operational modes, and a control system for said transmission having a control member movable between a plurality of positions to respectively condition said transmission for a particular mode of operation:
   (A) an ignition switch for completing an ignition circuit to said engine;
   (B) a generally annular gear selector member encircling said ignition switch, said member being mounted for rotation about its central axis; and
   (C) means operative in response to rotary movement of said annular gear selector member into selected angular positions to selectively position said control member in each of its said plurality of positions.

2. A motor vehicle according to claim 1 wherein said transmission is an automatic transmission.

3. A motor vehicle according to claim 1 wherein
   (D) said control member comprises a control valve; and
   (E) said transmission is conditioned as aforesaid by the selective routing of pressure fluid in response to selective positioning of said control valve.

4. A motor vehicle according to claim 1 and further including
   (D) means operative, with said ignition switch in a position closing said ignition circuit, in response to movement of said annular selector member to a predetermined angular position to complete an electrical circuit to the starter for said engine.

5. A motor vehicle according to claim 1 wherein:
   (D) said motor vehicle includes front seat means comprising a separate driver's seat and a separate passenger seat positioned beside said driver's seat in laterally spaced relation thereto; and
   (E) said ignition switch and encircling annular gear selector member are positioned generally between said seats with said gear selector member mounted for rotation about a generally vertical axis.

6. A motor vehicle according to claim 1 wherein
   (D) said ignition switch and encircling gear selector member are positioned on the instrument panel of said motor vehicle with said gear selector member mounted for rotation about an axis extending generally longitudinally of said vehicle.

7. A motor vehicle according to claim 6 wherein said ignition switch and encircling gear selector member are mounted on said instrument panel between the steering mechanism and the driver's door.

No references cited.

A. HARRY LEVY, *Primary Examiner.*